ary sorts to be expanded

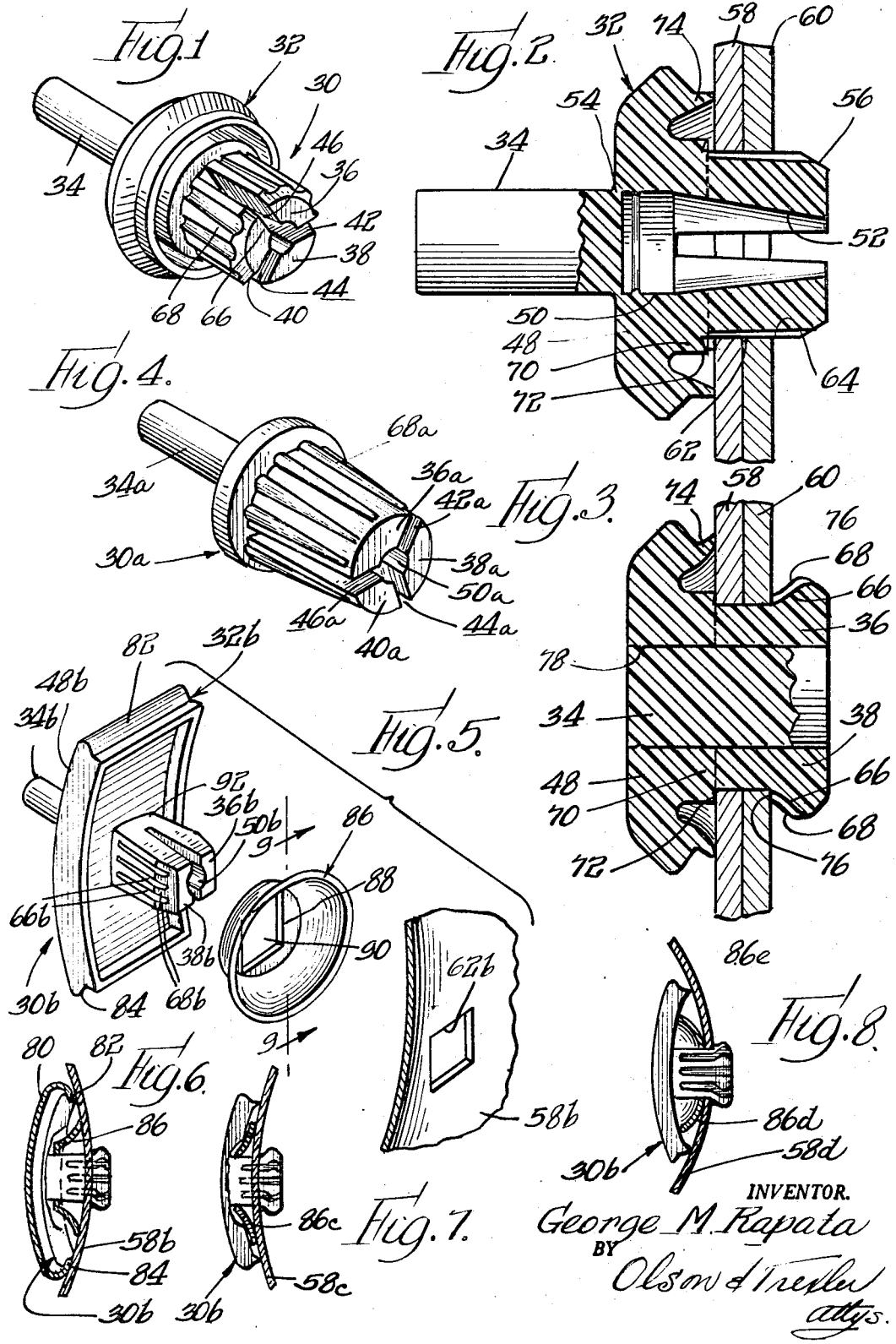

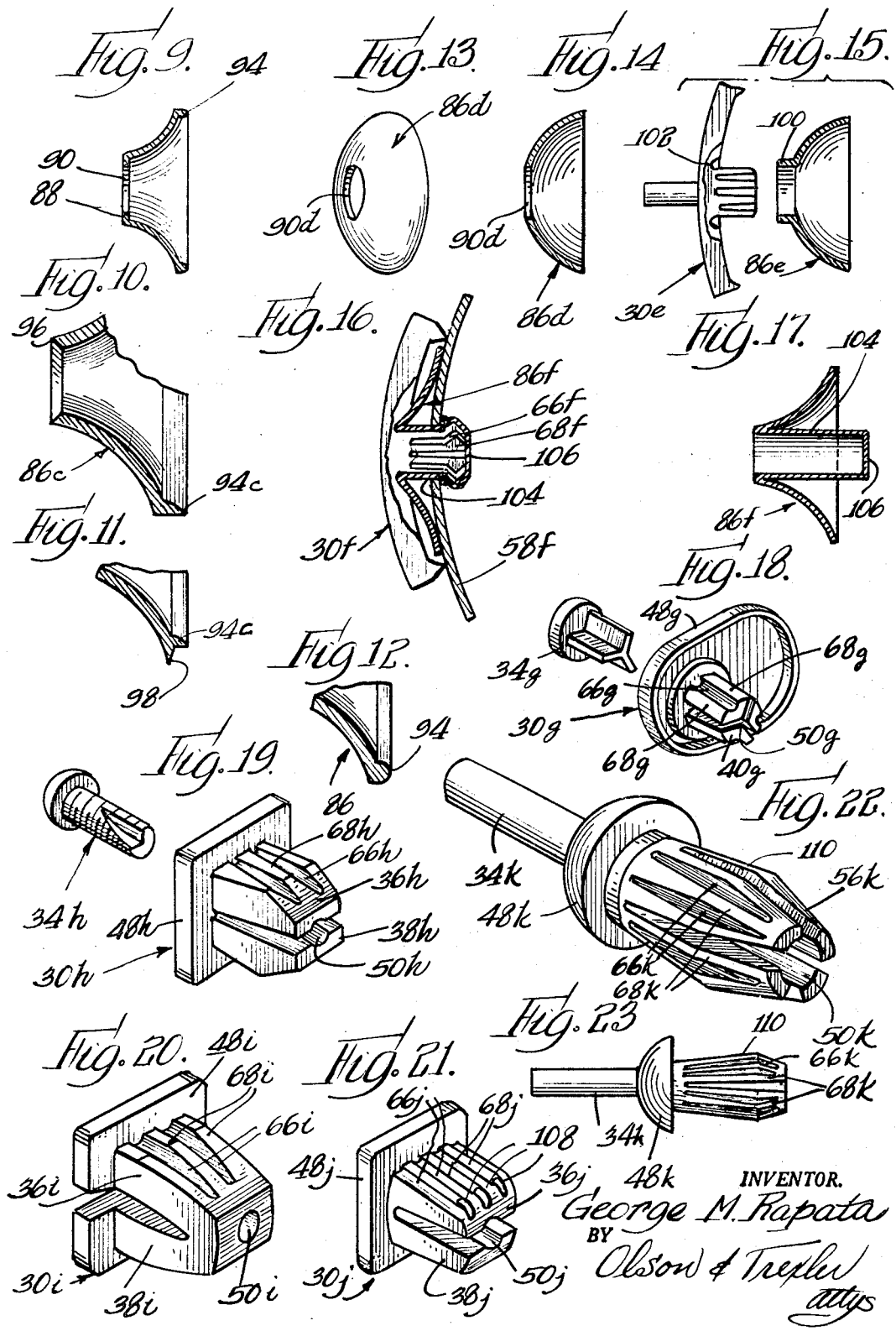

United States Patent Office
3,385,157
Patented May 28, 1968

3,385,157
PLASTIC FASTENER
George M. Rapata, Park Ridge, Ill., assignor to Illinois Tool Works Inc., Chicago, Ill., a corporation of Delaware
Continuation of application Ser. No. 54,649, Sept. 8, 1960. This application Mar. 3, 1967, Ser. No. 633,645
10 Claims. (Cl. 85—72)

ABSTRACT OF THE DISCLOSURE

A plastic anchor or fastener for connection to an apertured work structure, which plastic fastener has a slotted shank providing separate sections to be expanded by a drive pin or expansion member. The shank sections have a peripheral portion defined by the plurality of alternate ribs and grooves providing a progressively diminishing mass, portions of the ribs being compressed into the grooves during assembly with the work structure and thereby presenting anchoring shoulders.

Specification

This application is a continuation of my co-pending application Ser. No. 54,649 filed Sept. 8, 1960 and now abandoned.

The present invention relates to novel fastener devices, and more particularly to novel plastic fastener devices or anchor members adapted to be applied to apertured work structures.

Fastener devices of the type generally contemplated herein have heretofore been suggested and include an expandable shank adapted to be inserted into an apertured work structure and an element such as a drive pin or screw adapted to be inserted into the shank for expanding the shank against the margin of the work structure aperture for securing the device with respect to the work structure. While certain of the heretofore proposed devices function satisfactorily, it has, in many instances, been necessary to provide devices with different shank lengths for different thicknesses of work structures. Furthermore, in many instances, it has been necessary to provide holes of different diameters in work structures of different thicknesses in order to accommodate the shanks of heretofore proposed devices, and certain of such devices have been formed so that the force required to apply the drive pin, screw or similar element to the expandable shank increases unduly when the devices are applied to relatively thick work structures.

An important object of the present invention is to provide a novel plastic fastener member or anchor device having an expandable shank which is adapted to be applied to apertured work structures of widely differing thicknesses.

Another object of the present invention is to provide a novel plastic fastener or anchor member having a shank adapted to be applied to work structures of different thicknesses having apertures therethrough of the same diameter.

Still another important object of the present invention is to provide a novel fastener or anchor device of the above described type which is constructed so that the force necessary to apply a drive pin to the expandable shank is not unduly increased when the device is applied to relatively thick work structures.

Other objects and advantages of the present invention will become apparent from the following description and the accompanying drawings wherein:

FIG. 1 is a perspective view showing a fastening device or anchor member incorporating one embodiment of the present invention;

FIG. 2 is a partial sectional view showing the device of FIG. 1 partially applied to an apertured work structure;

FIG. 3 is a sectional view showing the device of FIGS. 1 and 2 fully applied to the work structure;

FIG. 4 is a perspective view showing another embodiment of the present invention;

FIG. 5 is an exploded perspective view showing another embodiment of the present invention including a washer and an apertured work panel with which the fastening device is adapted to be assembled;

FIG. 6 is a partial sectional view on a reduced scale showing the elements of FIG. 5 in assembled relationship;

FIG. 7 is similar to FIG. 6 but shows the manner in which the fastener or anchor member may be applied to the convex side of a curved panel as well as the concave side of the panel, as illustrated in FIG. 6;

FIG. 8 is a view similar to FIG. 6 but shows a modified arrangement of the parts;

FIG. 9 is a sectional view of the washer shown in FIG. 5 taken generally along line 9—9 in FIG. 5;

FIG. 10 is a sectional view showing a modified embodiment of the washer;

FIG. 11 is a fragmentary sectional view showing a further embodiment of the washer;

FIG. 12 is similar to FIG. 11 but shows a margin of the washer of FIG. 9 in greater detail.

FIG. 13 is a perspective view of the washer shown in the assembly of FIG. 8;

FIG. 14 is a sectional view of the washer shown in FIG. 13;

FIG. 15 is an exploded view partially in section of a fastener and washer assembly incorporating another embodiment of the present invention;

FIG. 16 is a partial sectional view showing an assembly including another modified form of the present invention;

FIG. 17 is a sectional view of the sealing washer in the assembly shown in FIG. 16;

FIG. 18 is an exploded perspective view showing still another embodiment of the present invention;

FIG. 19 is an exploded perspective view showing a further modified form of the present invention;

FIG. 20 is a perspective view showing a further embodiment of the present invention;

FIG. 21 is a perspective view showing still another construction incorporating features of the present invention;

FIG. 22 shows another modification of the present invention; and

FIG. 23 is a side elevational view showing the device of FIG. 22.

Referring now more specifically to the drawings wherein like parts are designated by the same numerals throughout the various figures, a fastening device 30 incorporating one embodiment of the present invention is shown in FIGS. 1, 2 and 3. This device as well as the remaining embodiments disclosed herein, is preferably molded from a tough, resilient plastic material such as nylon or acetal resin. The fastening device 30 comprises a main body member 32 and a securing element or drive pin 34 which may selectively be formed integrally with or separately from the main body member.

The member 32 comprises an expandable shank provided by a plurality of axially extending shank sections 36, 38 and 40 separated from each other by generally axially extending slots 42, 44 and 46. Trailing ends of the shank sections merge with and are integrally joined to a radially extending head section 48 adapted to overlie an outer surface of the structure.

A central bore 50 extends axially through the head portion 48 and also through the expandable shank provided by the shank sections 36, 38 and 40. As shown in FIG. 2, a portion of the bore 50 extending through the circumferentially continuous head 48 is of substantially uniform diameter, while a portion of the bore extending through the expandable shank and defined by inner surfaces 52 of the shank section is tapered toward the entering ends of the shank sections. The bore 50 is adapted to receive the drive pin 34 which, in this embodiment, is initially integrally joined to the head 48 at 54. The integral junction 54 will, of course, be broken when the pin is forced into the bore.

In this embodiment the expandable shank provided by the sections 36, 38 and 40 has a generally cylindrical and, if desired, a slightly tapered outer configuration. The entering extremities of the shank sections are beveled as at 56 for facilitating entry of the shank sections into a work structure. The shank sections are adapted to be inserted into an apertured work structure which in the embodiment shown in FIGS. 2 and 3, includes workpieces or panels 58 and 60 having aligned apertures 62 and 64 of uniform diameter therethrough.

In accordance with an important feature of the present invention the shank sections 36, 38 and 40 are formed with axially extending flutes or grooves 66 in their outer surfaces which provide ribs or lands 68 therebetween. The ribs or lands provide circumferentially interrupted and limited elements of the expandable shank for engagement with the margin of the work structure aperture in the manner described below. In this embodiment it will be noted that the grooves or flutes progressively increase in width and slightly in depth toward the entering extremities of the shank sections and conversely the ribs or lands become progressively narrower or, in other words, have side walls which taper toward the entering extremities of the shank sections. This arrangement facilitates expanding of the shank and forming of the lands or ribs around the margin of the work structure when the pin 34 is driven into the bore 50 in the manner described more fully below.

The head portion 48 includes an annular section 70 extending around and integral with trailing ends of the shank sections. The annular section 70 presents a clamping and sealing surface 72 which extends generally radially outwardly from the shank sections and is slightly relieved or undercut as shown in FIG. 2. When the device is fully applied to the work structure, as shown in FIG. 3, the narrow peripheral corner edge of the surface 72 will be aggressively urged against the outer surface of the work structure around the aperture 62 so as to provide a seal around the aperture.

The head portion 48 also includes an annular resilient flange 74 which extends generally axially around and in spaced relationship with respect to the annular abutment section 70. As shown in FIG. 2, the annular flange 74 normally extends axially beyond the clamping and sealing surface 72 toward the entering extremities of the shank sections. Thus, when the device is fully applied to the work structure as shown in FIG. 3, the annular flange 74 will be aggressively urged against the outer surface of the work structure so as to provide a secondary seal. Furthermore, the resilient annular flange 74 will be deflected in the manner shown so as to provide a resilient clamping pressure for clamping the panels or workpieces 58 and 60 together.

The device 30 may be easily applied to the apertured work structure by inserting the shank sections through the aligned apertures in the workpieces or panels and then forcing the pin 34 into the bore 50. Initial entry of the shank sections into the apertured work structure is facilitated by the bevel 56 provided at the entering extremities of the sections and also by the slightly tapered formation of the generally cylindrical expandable shank.

When the pin 34 is driven into the bore 50, it passes relatively easily through the first portion of the bore in the head 48, since the diameter of this portion of the bore is substantially the same as the diameter of the pin. As the pin engages the tapering surfaces 52 of the shank sections, the shank sections are expanded radially outwardly as shown in FIG. 3. As this expansion occurs the ribs or lands 68 are forced against the edges of the apertures 62 and 64 and as a result of the relative high unit pressure applied against the limited areas of the lands, the portions of the lands in engagement with the edges of the apertures are deformed and compressed as shown in FIG. 3. At the same time, portions of the ribs or lands which project beyond the rear side of the work structure are expanded behind the work structure and substantially radially extending shoulders 76 are formed between the crushed portions of the lands or ribs and the expanded portions for secure positive engagement with the rear side of the work structure.

The lands or ribs 68 are formed so that the shoulders 76 may be produced at any point along the length of the ribs so that the device is particularly adapted to be applied to work structures having a wide variety of different thicknesses. Furthermore, since the configuration of the expandable shank provided by the shank sections is generally cylindrical either with or without a slight taper, the diameter of the apertures in the workpieces or panels should be the same, regardless of the thickness of the panels.

The tapering formation of the portion of the bore defined by the inner surfaces 52 of the shank sections tends to create progressively increasing resistance to the passage of the drive pin 34 into the bore. However, this tendency to increase the resistance of the entry of the drive pin and therefore the force necessary to apply the pin is largely offset or completely overcome by the above mentioned tapered formation of the ribs or lands 68. With this arrangement the surface area and cross section of the lands decreases so that the lands may be progressively more easily compressed and deformed from their trailing ends toward the entering extremities of the shank sections.

As indicated above, the head portion 48 is formed with means for providing effective seals around the work structure aperture for preventing the passage of moisture dust and the like through the apertures and around the device. At the same time the pin 34 tends to seal the central bore 50. In order to insure the provision of a seal between the pin and the body member 32, a small annular bead 78 is continuously formed around the surface of the portion of the bore in the head 48, which bead is adapted to aggressively engage and partially imbed itself in the periphery of the drive pin 34 as shown in FIG. 3.

In this embodiment the tapering inner surfaces 52 of the shank sections and the slots 42, 44 and 46 extend within and axially overlap the circumferentially continuous annular abutment section 70 of the head, as shown in FIG. 2. This construction promotes flexibility of the shank sections and facilitates expansion thereof while enabling the shank sections to be provided with relatively thick cross-sections for strength and durability. Furthermore, this construction tends to cause radial expansion of the annular abutment section 70 when the drive pin is driven into the bore 50. The expanded annular section 70 serves to provide a constant force tending to restrict the intermediate portion of the bore 50 surrounded thereby so that the drive pin is, in effect, ripped intermediate its ends for preventing unauthorized axial movement or loosening in either axial direction.

FIG. 4 shows a device 30a which is similar to the above-described structure, as indicated by the application of identical reference numerals with the suffix a added to corresponding parts. A principal difference of this device over the embodiment described above lies in the specific formation of the ribs 68a. It will be noted that the ribs 68a are formed so that they project laterally outwardly from the substantially cylindrical surface provided by the shank sections while in the above described embodiment the laterally projecting ribs or lands are provided by forming grooves in the generally cylindrical surface. Furthermore, the ribs 68a have their lateral outwardly facing surfaces as well as their side surfaces tapered toward the entering extremities of the shank sections for further progressively facilitating collapsing or deforming of outer end portions of the ribs when the device is applied to a work structure.

FIGS. 5 and 6 show another embodiment of the present invention similar to the above described structures as indicated by the application of identical reference numerals with the suffix b added to corresponding parts. In this embodiment the expandable shank is provided with a generally rectangular or polygonal cross-sectional shape for cooperative engagement with edges of a polygonal aperture 62b in the work piece for preventing the fastening device from turning relative to the work piece. Furthermore, the head portion 48b is formed so that it is particularly suitable for retaining work pieces such as a channel shaped molding strip 80 as shown in FIG. 6. Thus the head portion 48b is elongated for traversing the width of the molding strip and is provided with beveled ends or abutment surfaces 82 and 84 for overlying inturned flanges of the channel-shaped molding strip.

In this embodiment it is contemplated that a washer 86 may be assembled with the fastening device for providing a seal around the work piece aperture since, as shown best in FIG. 6, the head portion of the fastening device does not mate with the surface of the work piece. The washer shown in this embodiment is also shown in FIGS. 9 and 12 and comprises a resilient generally bell-shaped body formed either from a tough resilient plastic material similar to that of the fastening device or from metal. At the smaller end of the bell-shaped body there is provided an inverted flange 88 adapted sealingly to engage the under surface of the head portion 48b. The flange 88 is provided with a polygonal aperture 90 for snugly receiving the shank sections, which shank sections merge with each other and present a circumferentially uninterrupted shank portion 92 shown best in FIG. 5 for further providing a seal between the shank and the flange 88 of the washer. The opposite end of the washer is provided with an axially projected rounded bead 94 for providing a seal between the washer and the work piece.

FIG. 7 shows the manner in which the fastening device 30b may be applied to the convex rather than the concave side of an arcuate work piece. This embodiment further shows the fastening device assembled with a sealing washer 86c. This washer differs from the above described washer 86 in that it is provided with an axially facing relatively sharp edge 96 at its smaller end for impingement against the under surface of the fastener head. Furthermore, the above mentioned rounded bead has been replaced by axially extending flange 94c which presents a relatively sharp knife edge for impingement against and sealing engagement with the surface of the work piece. FIG. 11 shows a further slight modification of a generally bell-shaped washer of the type described above, in which modification the large end of the washer is formed so as to present a radially extending surface 98 outwardly of the flange 94c, which surface provides a stop for limiting collapsing of the sealing flange 94d when the washer is compressed against a work piece in a manner generally illustrated in FIG. 7.

FIG. 8 shows another application of the fastener 30b in which the fastener is assembled with a modified sealing washer 86d. The washer 86d is also shown in FIGS. 13 and 14. In this embodiment the washer is dome shaped or generally semi-spherical in configuration. FIG. 8 illustrates the fact that the sealing washer may be assembled with the fastener so that the smaller end of the washer sealingly engages the work piece around the aperture while the larger end of the washer sealingly engages the under surface of the fastener head. In other words, the dome-shaped washer and also the bell-shaped washer described above may, in many instances, be selectively positioned with either end in engagement with the head of the work piece.

FIG. 15 shows a structure similar to that of FIGS. 5–8, as indicated by the application of identical reference numerals with the suffix e added to corresponding parts. In this embodiment the washer 86e is provided with an axially extending neck portion 100 which is adapted to seat within an annular groove 102 formed in the under surface of the fastener head for providing an improved seal.

FIGS. 16 and 17 show a further embodiment of the present invention which is similar to the structures of FIGS. 5–15, as indicated by the application of identical reference numerals with the suffix f added to corresponding parts. In this embodiment the washer 86f is provided with an elongated axially extending sleeve 104 adapted snugly to receive the shank sections of the fastener. The sleeve is imperforate and includes a closed end wall 106 so as to preclude any possibility of leakage through or between the shank sections of the fastener. The wall of the sleeve 104 is quite thin as compared with the main body of the washer so that when the assembled fastener and washer are applied to the apertured workpiece, as shown in FIG. 16, the portion of the sleeve extending beyond the inner side of the panel may be easily stretched by the expanding shank sections.

FIG. 18 shows another form of a fastening device incorporating features of the present invention. In this embodiment the retaining head 48g has a configuration specifically different from that of the corresponding parts described above. Furthermore, in this embodiment the central passageway 50g through the fastener is formed with a generally Y-shaped cross-section rather than as a circular bore, and the drive pin 34g is provided with a complementary Y-shaped transverse cross-section. This specific construction promotes a more uniform distribution of the expanding pressure around the entire periphery of the shank when the drive pin is forced into the aperture or passageway 50g.

FIGS. 19, 20 and 21 respectively show fastening devices 30h, 30i and 30j which incorporate specifically different embodiments of the present invention. In all of these embodiments the shank sections have a polygonal overall transverse cross-section and the straight sides of the shank sections are adapted to engage side edges of complementary polygonal apertures in workpieces for preventing the fasteners from rotating within the workpiece apertures. Thus, these fasteners are particularly adapted to utilize a securing element such as a screw which may be threaded into their axially extending bores rather than a drive pin. Such a screw is illustrated by the screw 34h shown in FIG. 19. The walls of the bores of these devices are smooth or unthreaded, as are the bore walls of all of the other devices disclosed herein so that when the screw is applied thereto, it will tend to form or impress complementary thread segments in the bore walls and also expand the shank sections. It will be appreciated that, if desired, either integral or separate drive pins could be utilized in the embodimnets of FIGS. 19–21, and a screw member could be used in place of the drive pins of the other embodiments disclosed herein. In addition to the previously mentioned features, the embodiment shown in FIG. 21 illustrates how protuberances or nibs 108 may be formed on the shank sections so as to project laterally outwardly of the ribs or lands at the entering extremities of the shank sections. These protuberances or nibs may serve to retain the fastener loosely and temporarily within an apertured workpiece until the complementary screw member or drive pin is applied.

FIGS. 22 and 23 show a further embodiment of the present invention which is similar to structures described above as indicated by the application of identical reference numerals with the suffix k added to corresponding parts. In this embodiment the central bore 50k is initially formed with a substantially uniform diameter throughout while the shank sections are provided with first surface portions 110 which flare outwardly from the head 48k to a junction with the tapering or beveled entering end portions 56k. With this arrangement the shank sections will be collapsed upon insertion into a work structure aperture. Subsequently the shank sections will be expanded and the ribs or lands will be formed around the margin of the workpiece in the manner described above when the drive pin is forced into the bore 50k. It will be noted that the grooves 66k become progressively deeper and the ribs or lands become progressively narrower in a direction extending from the head of the fastener along the flaring portion of the shank sections to the junction with the tapering end portion of the shank sections. The progressively increasing depth of the grooves compensates for the progressively increasing thickness of the flaring portions of the shank sections so that the shank sections may be readily expanded and formed around the margin of the work structure aperture in the manner described above.

While the preferred embodiments of the present invention have been shown and described herein, it is obvious that many structural details may be changed without departing from the spirit and scope of the appended claims.

The invention is claimed as follows:

1. A device of the type described comprising a one-piece member of tough deformable resilient plastic material, said member including a head portion adapted to overlie one side of an apertured work structure, and a plurality of generally axially extending shank sections for insertion through an apertured work structure, said member having a passageway extending axially therethrough and partially defined by inner surfaces of said shank sections, said shank sections being separated from each other by generally axially extending slots which intersect said passageway, said shank sections having radially solid walls between said slots and having outer surfaces providing a cross-sectional configuration of predetermined dimensions, each of said shank sections including a plurality of circumferentially narrow and spaced compressible ribs separated from each other by flute means and extending at least from adjacent said head to adjacent entering extremities of the shank sections and projecting laterally outwardly from said outer surfaces thereof and having outer edges defining a second transverse cross-sectional configuration having dimensions greater than the predetermined dimensions for engagement with a margin of a work structure aperture when a complementary element is inserted into said passageway for engaging inner surfaces of said shank sections and expanding the shank sections, portions of said ribs within a work structure aperature when the shank sections are expanded being deformed and collapsed for creating generally radially extending shoulders between the collapsed rib portions and additional rib portions extending beyond the work structure, said expanding element and at least a portion of said inner surfaces being relatively tapered for causing outer end portions of said outer surfaces as well as said ribs to be located outwardly of said first mentioned transverse cross-sectional configuration for engaging behind the work structure when the shank sections are expanded, said head including a radially extending sruface extending around and integral with trailing ends of said shank sections, said radially extending surface being undercut thereby presenting a narrow circumferentially continuous edge for sealing engagement with an outer surface of a work structure, and said head including circumferentially continuous annular resilient flange means on the periphery of the head projecting axially toward entering extremities of said shank sections and beyond said edge spaced radially from said edge for engagement with the work structure around said edge.

2. A device, as defined in claim 1 which includes a smooth walled drive pin insertable into said passageway for expanding said shank elements, said head including a small annular bead projecting inwardly of said passageway for sealing engagement with said pin.

3. In combination, a stud member and an apertured work piece into which the stud member is to be anchored, the stud member having a body portion adapted to engage the work piece on one surface thereof and a shank portion extending axially from the body portion and adapted to be anchored within the work piece aperture, the shank portion and the work piece aperture being complementary in shape, said shank portion being provided with a plurality of axially extending radial slots providing a plurality of independently movable resilient shank sections, said shank sections being spaced apart to provide a central axially extending bore therebetween, and an expansion member insertible into said bore when said device is assembled with the work piece aperture, each of said shank sections including an outer peripheral portion comprising a plurality of alternate axially extending ribs and grooves, said ribs as diminished by said grooves defining the material mass of said peripheral portion of said shank sections, said grooves having a radial and circumferential double taper which widens and deepens said grooves in a direction away from the body portion whereby said ribs are shaped by the grooves to provide a progressively diminished material mass and progressively diminished relative circumferential extent along the length of the shank sections in a direction extending away from the body portion, said ribs at their outer surface defining a circumferentially extending surface for engagement with the wall of the aperture, said surface defining the major dimension of said peripheral portion of said shank sections while the base of the grooves define the root or minor dimensions of said peripheral portion of said shank sections, said bore and said shank sections expanding radially during projection of the expansion member axially through said bore in a direction away from the body upon application of a driving force to the expansion member, said aperture having a dimension defined as falling between the limits of points which are in excess of the said root dimension and being equal to or less than said major dimension, the diminishing material mass of said peripheral portions defined by said ribs and grooves providing, upon pressure engagement with the work piece aperture along the edge of said aperture opening in the work piece at the surface opposite that contacted by the head, a plurality of peripheral shoulders on each of said shank sections radially outwardly beyond the work piece aperture edge to thereby anchor the stud device in position, said peripheral portions when expanded having a dimension at the root of the groove with the axial limits of said aperture never in excess of the aperture dimension, the diminishing mass of said peripheral portions and said combined expansion member and bore shape being related to each other for relieving increases in the required driving force as the expansion member is progressively advanced into said bore, said ribs being crushed against the wall of the aperture and moved peripherally into said grooves to provide greater circumferential bearing contact with the wall of the aperture following expansion, the lower axial limit of said crushed material being adjacent to and defining the shoulder means for anchoring the stud in position.

4. A stud device as defined in claim 3 wherein the outer peripheral portion of said shank sections prior to insertion in said aperture diverge outwardly from said body portion to a point axially spaced therefrom and then taper inwardly from said point to the free end of said shank, said bore being initially substantially cylindrical, the diameter of said shank at said point initially being greater than the diameter of said aperture whereby insertion of said shank causes said sections to collapse radially inwardly and thereby create a tapered bore prior to projection of said expansion member and resultant radial expansion, crushing of said ribs and formation of said shoulder means.

5. A stud device as defined in claim 3 wherein the slots between said shank sections progressively increase in width in a direction away from said body portion.

6. A stud device as defined in claim 3 wherein the grooves and slots have the volumetric capacity to accept the material displaced from adjacent crushed ribs whereby the forces crushing the ribs do not exceed the delamination strength of the material forming the device.

7. A stud device as defined in claim 3 wherein the said outer surface of said ribs falls on an imaginary substantially cylindrical surface and said bore is tapered through a substantial portion of its length.

8. A stud device as defined in claim 3 wherein said shank portion is provided with a converging taper at the end thereof remote from said body portion.

9. A stud device as defined in claim 3 wherein said central bore is of reduced diameter in an axial direction extending away from the body portion.

10. A stud device as defined in claim 3 wherein said expansion member comprises a pin integrally attached to said stud body portion by a frangible connecting web.

References Cited

UNITED STATES PATENTS

| | | | |
|---|---|---|---|
| 2,172,125 | 9/1939 | Hamill | 85—83 |
| 2,402,287 | 6/1946 | Kearms | 85—72 |
| 2,836,214 | 5/1958 | Rapata | 58—80 |
| 2,976,345 | 3/1961 | Whitted | 151—41.75 |
| 2,997,910 | 8/1961 | Tinnerman | 85—72 |

FOREIGN PATENTS

| | | |
|---|---|---|
| 589,648 | 6/1947 | Great Britain. |
| 440,890 | 5/1912 | France. |
| 1,094,738 | 12/1954 | France. |
| 1,006,733 | 4/1957 | Germany. |
| 453,996 | 12/1949 | Italy. |

MARION PARSONS, JR., *Primary Examiner.*